(No Model.)

G. KAUTZ.
MASON'S FLOAT.

No. 398,732. Patented Feb. 26, 1889.

WITNESSES:
Chas. Nida
C. Sedgwick

INVENTOR:
G. Kautz
BY Munn & Co.
ATTORNEYS.

UNITED STATES PATENT OFFICE.

GEORGE KAUTZ, OF ALBANY, NEW YORK, ASSIGNOR TO HIMSELF AND LEWIS A. KAUTZ, OF SAME PLACE.

MASON'S FLOAT.

SPECIFICATION forming part of Letters Patent No. 398,732, dated February 26, 1889.

Application filed August 22, 1888. Serial No. 283,460. (No model.)

*To all whom it may concern:*

Be it known that I, GEORGE KAUTZ, of Albany, in the county of Albany and State of New York, have invented a new and Improved Mason's Float, of which the following is a full, clear, and exact description.

The object of my invention is to construct a mason's float and handle so that said float and handle may be easily and quickly attached or disengaged at pleasure.

A further object is to construct the parts so that the blade shall be held firmly by the handle without the use of nails, and thereby enable a mason to use the float until it is worn out, the handle being capable of usage on another float of like construction for an indefinite period; and it consists in the parts which will be hereinafter described, and pointed out in the claims.

Reference is to be had to the accompanying drawings, forming a part of this specification, in which similar letters of reference indicate corresponding parts in all the figures.

Figure 1:
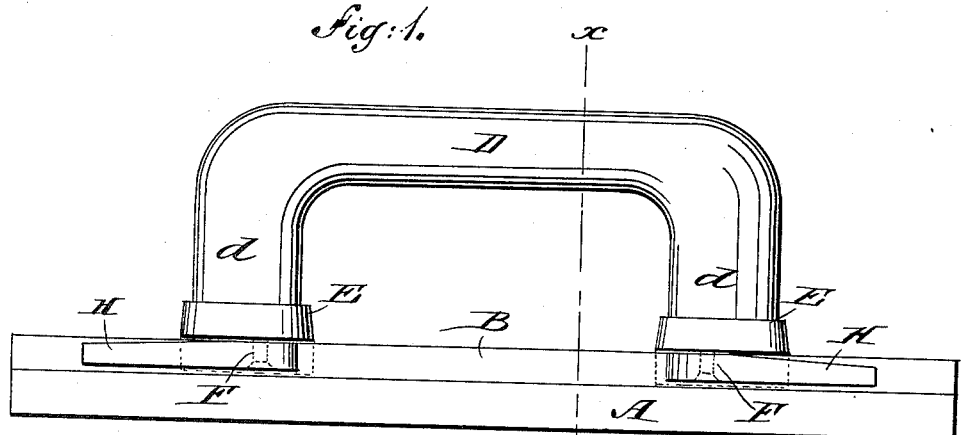
Figure 2:
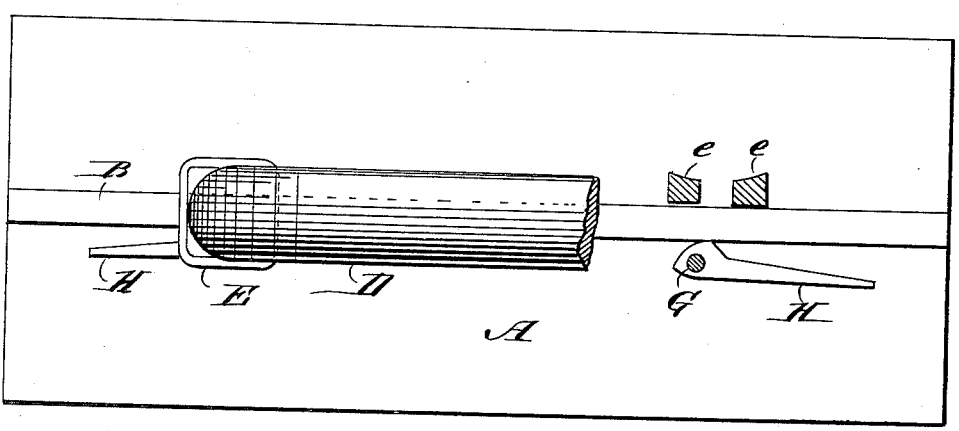
Figure 3:
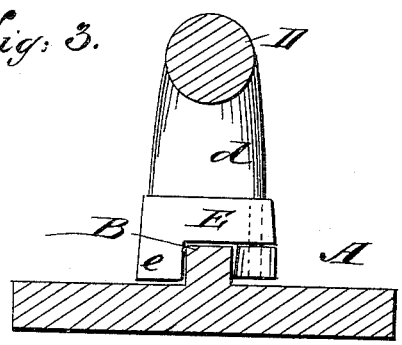
Figure 4:
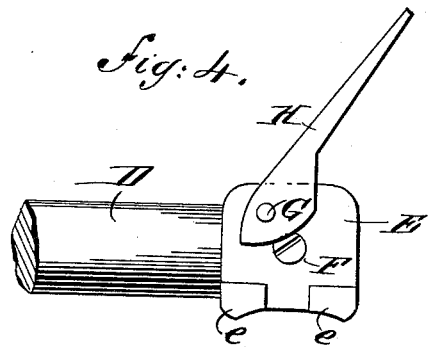

Figure 1 represents a side elevation of my device. Fig. 2 is a top plan view with a part of the handle broken away so as to disclose the clamping means. Fig. 3 is a section on the line $x\ x$ of Fig. 1, and Fig. 4 is a detail bottom view of the handle.

A represents the blade of the float, and B is a central longitudinal ridge formed thereon.

D indicates a bridge-handle, whose respective ends, $d\ d$, are provided with caps E E, rigidly secured thereto. Each cap E is provided with two foot-lugs, $e\ e$. A screw, F, passes through an opening in a cap, so as to firmly unite the cap and handle.

G is a screw or pin for pivotally connecting a cam-lever, H, to the cap. There is a space between each cam and the lugs $e\ e$, which forms a recess for the reception of the ridge B.

The operation is as follows: When the cams are in the position shown in Fig. 4, there is sufficient space between the inner face of each cam and the lugs $e\ e$ to admit the ridge B of the float. When in that position, the handle may be seated on the float. Then by turning the levers H to the position shown in Fig. 2 the cam part of the lever is caused to bind the ridge B, thereby firmly uniting the handle and float. It is obvious that the handle may be disengaged from the float by turning the cam-levers to the position shown in Fig. 4. The arrangement of the parts prevents a strain on the blade of a float and thereby prevents the float from warping.

Having thus described my invention, what I claim as new, and desire to secure by Letters Patent, is—

1. A mason's float consisting of a blade provided with a ridge, in combination with a handle and a pivoted clamp for binding the handle and ridge aforesaid, substantially as shown and described.

2. A mason's float consisting of a blade provided with a ridge, in combination with a handle, the respective ends of the handle being provided with a cam and lugs, $e\ e$, forming a recess for the reception of the ridge aforesaid, substantially as shown and described.

3. A mason's float consisting of a blade provided with a ridge, in combination with a handle, the respective ends of the handle being provided with a cam-lever and lugs, substantially as shown and described.

4. A handle for a mason's float, consisting of the bridge-body D $d\ d$, the caps E E, fixed to the ends $d\ d$ aforesaid, each cap E being provided with one or more lugs, $e$, and a cam-lever, H, substantially as shown and described.

5. A mason's float consisting of the bridge-body D $d\ d$, the caps E E, fixed to the respective ends $d\ d$ aforesaid, each cap E being provided with one or more lugs, $e$, and a cam-lever, H, in combination with a blade having a ridge, substantially as shown and described.

GEORGE KAUTZ.

Witnesses:
PETER KRAMER,
CHARLES SCHADE.